United States Patent [19]
Brandt

[11] 3,747,490
[45] July 24, 1973

[54] LENS ACCESSORY HOLDER
[75] Inventor: Edison R. Brandt, Boca Raton, Fla.
[73] Assignee: Polaroid Corporation, Cambridge, Mass.
[22] Filed: Apr. 24, 1972
[21] Appl. No.: 246,917

[52] U.S. Cl. .................................... 95/11, 95/44
[51] Int. Cl. .......................................... G03b 17/56
[58] Field of Search .................... 350/318; 95/1, 11, 95/44

[56] References Cited
UNITED STATES PATENTS
| | | | |
|---|---|---|---|
| 2,926,577 | 3/1960 | Albrecht | 95/44 |
| 3,067,664 | 12/1962 | Winslow | 95/44 |
| 2,992,805 | 7/1961 | Weldon | 95/11 X |
| 2,970,509 | 2/1960 | Barthruff | 88/1.5 |

Primary Examiner—John M. Horan
Attorney—Michael Bard, Robert F. Peck et al.

[57] ABSTRACT

This disclosure explains a concept for a simple accessory holder. The accessory holder, in one embodiment, comprises a wide band having, at each end, a backwardly extending arm with a detent. The accessory holder is made from a springy material so it will snap onto a shutter housing and be held in place by the detents. It comes off by urging the arms apart slightly so the detents come away from the shutter housing. At the center of the band is a hole with means for retaining a filter, a macro lens, and some other lens accessories over an objective lens located in the shutter housing. In one embodiment, the accessory holder and the lens accessory are an integral article.

5 Claims, 3 Drawing Figures

PATENTED JUL 24 1973 3,747,490

LENS ACCESSORY HOLDER

BACKGROUND OF THE INVENTION

The present invention relates to photographic filters and other lens accessories and, in particular, to an article for mounting such accessories. In the past, the general practice for mounting lens accessories has been to make them so they will snap or screw into the bezel of the objective lens. This practice usually requires the use of precisely made parts, such as finely threaded retaining rings, to insure compatibility with the objective lens the accessory is attached to. Thus, the accessories and the accessory holders are costly. In some circumstances, the former solution is not practical for lens accessories because the objective lens mounting is too compact to provide a convenient means for attaching the accessory or a holder to it.

SUMMARY OF THE INVENTION

An accessory holder, according to the concepts of this invention, comprises a wide band of a springy material having an arm, with a detent, formed at each end of the band. The arrangement of parts and the choice of material permit the accessory holder to snap onto the shutter housing, where it is retained by the detents, rather than onto the objective lens. In the most general form of this accessory holder, the band is made from a common spring material, such as phosphor bronze, and has a hole with a means for retaining a desired accessory positioned in front of the objective lens. Different accessories are fitted into the hole as required. The accessory holder may be made with an extension to position an auxiliary accessory over the photodetector of an automatic exposure system to adjust the exposure control in accordance with any change in exposure induced by the main accessory.

An important part of the present concept is that the springy material the band is made from can be transparent, for example, polycarbonate plastic or polymethyl methacrylate. When the band is formed from a transparent plastic, the accessory, be it a lens or a filter, can be made as an integral part of the accessory holder, e.g., a one-piece molding. This is particularly advantageous if the accessory holder is formed with the extension, since the auxiliary accessory can also be molded as an integral part.

Accordingly, an object of the present invention is to provide a simple objective lens accessory holder for attaching to a shutter housing.

Another object of the present invention is a holder, for objective lens accessories, having an extension for positioning an auxiliary accessory over a photocell associated with an automatic exposure control within the shutter housing to adjust the control in accordance with any change in the exposure due to the main accessory.

Yet another object of the present invention is a lens accessory holder suitable for fabrication together with the lens accessory itself as an integral article.

DESCRIPTION OF THE DRAWINGS

Other objects and many of the attendant advantages of the present invention will be better appreciated and said invention will be clearly understood by reference to the following detailed description when considered in conjunction with the accompanying drawings illustrating one embodiment of the instant invention, wherein.

DESCRIPTION OF THE PREFERRED EMBODIMENT

Figure 1:
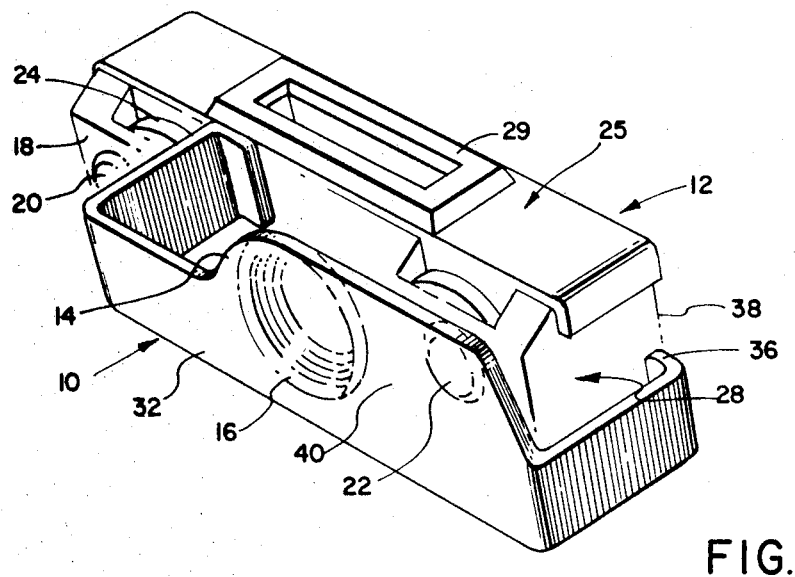
FIG. 1 illustrates one embodiment of a lens accessory holder attached to a shutter housing.

Reference should be made to FIG. 1 showing a first embodiment of an objective lens accessory holder 10, according to the present invention, attached to a shutter housing 12 of a reflex camera (not shown). In the embodiment illustrated, the accessory holder 10 and an optical element 14 are formed as a unitary article proportioned so it will snap onto the shutter housing 12.

The shutter housing 12 supports an objective lens 16 in its front wall 18. The front wall 18 has a button 20 for releasing a shutter (not shown) located to one side of the objective lens 16 and a window 22 for admitting light into a photocell (not shown) of an automatic exposure control located to the other side. A focusing knob 24 projects slightly from the top wall 25 of the shutter housing 12 so a photographer can rotate it with his forefinger. He thereby focuses the objective lens 16 through a gear train within the shutter housing 12 connecting the focusing means of the objective lens 16 to the focusing knob 24. On the other side of the shutter housing 12, a trim knob 26 projects slightly from the top wall 25. Turning the trim knob 26 effects small adjustments of the automatic exposure control located inside the shutter housing 12. A pair of side walls 28 (only one shown) encloses the ends of the shutter housing 12 providing structural support to it and excluding light and dirt from it. A socket 29 situated on the top wall 25 receives a linear flash bulb array (not shown in FIG. 1). The flash bulbs permit the making of artificially illuminated photographs. The other structure of the reflex camera is not germane to an understanding of the present invention and is omitted for the sake of clarity and conciseness in this specification.

The accessory holder 10 comprises a band 32 extending the width of the shutter housing 12 and two rearwardly extending arms 34. Each arm 34 has an inwardly extending detent 36 that snaps behind the rear corner 38 of the side wall 28. The band 32, the arms 34, and the detents 38 closely surround the shutter housing 12 and cling to it by means of the spring-like qualities of the materials that the accessory holder 10 is made from. Thus the accessory holder 10 supports itself when attached to the shutter housing 12. The detents 36 catch the shutter housing 12 by snapping behind the rear corners 38. Thus, the accessory holder 10 will not come off the shutter housing 12 unless the arms 34 are intentionally urged apart to free the detents 36 from behind the rear corners 38.

The optical element 14 (e.g., a filter or a magnifying lens) extends upwardly from the band 10 to cover the objective lens 16. All the light entering the camera through the objective lens passes through the optical element 14 first. As illustrated in FIG. 1, the optical element 14 can also extend down into the band 32.

Those skilled in the photographic arts understand that the use of a light filter with a photographic camera will require an adjustment of the camera's automatic exposure control. In the absence of any adjustment, when the filter is added photographs will be underexposed because the light received by the photocell is brighter than the light received by the objective lens. This is due to the attenuating effect of the filter placed in front of the objective lens.

A part of the present invention is to provide an extension 40 on the accessory holder 10 to position a secondary optical element 42 in front of the window 22 covering the photocell. If the optical element 14 is a filter, the secondary optical element 42 should have the same tint. The secondary optical element 42 affects the light entering the window 22 to the same degree that the optical element 14 affects light entering the objective lens 16. Thus, a lens accessory holder 10, with integral optical elements according to the present invention, automatically compensates the automatic exposure control for its effect on the exposure. Note that the band 10 is kept narrow on the button 22's side of the shutter housing 12 so it will not interfere with pressing the button 22.

The optical element 14 and the secondary optical element 42 often have identical properties. Thus, lens accessory holders 10 according to the present invention can be advantageously made as integral articles from transparent materials. In the instance when the optical element 14 and the secondary optical element 42, if any, is a filter, the accessory holder 10 and the optical element(s) 14 (and 42) can be manufactured from a trapsparent material in an integral piece as a single article. The transparent material is tinted in any convenient manner to impart the desired filtering properties to it. The tinting need not be restricted to the regions of the optical element 14 and the secondary optical element 42, but can extend throughout the accessory holder 10 article. Tinting the article throughout adds an appealing and pleasing visual aspect to it. The accessory holder 10 with its integral optical element(s) 10 and (and 42) can be made by bending from a flat material or by molding it directly to its final shape by well-known industrial methods.

The optical element 14 of the present invention can serve other photographic functions in addition to or instead of filtering the incident light. By curving the front and/or rear surfaces of the optical element 14, refractive power can be imparted to it. In this manner, a close-up attachment for use in conjunction with the objective lens 16 can be provided to take one-to-one photographs of small objects. Like ways other curvatures on the surfaces of the optical element 14 result in a wide angle auxiliary lens for use in conjunction with the objective lens 16. From the preceding description, it is clear that the accessory holder 10 and an optical element 14, having positive or negative refractive power, can be formed integrally as a molded article from a transparent material. It follows, too, that filtering properties can also be molded into the article so the optical element 14 will both filter and refract any incident light.

In some situations, any refractive power provided in the optical element 14 will change the camera's field of view significantly enough to effect the overall exposure level. If experience or analysis indicates that the field of view of the automatic exposure control should be modified accordingly to compensate for the change in exposure, appropriate refractive power can be provided on the secondary optical element 42 to affect the required change.

A preferred material for manufacturing lens accessory holders 10 with the integral optical element(s) 14 (and 42) as a unitary article is polycarbonate plastic. One suitable type is sold under the trademark Lexan by the General Electric company. This plastic is transparent, quite strong, and possesses sufficient elasticity to provide the spring-like action required of the arms 34. Integral lens accessory holders 10 could also be made from polymethyl methacrylate and polystyrene.

By using a material with sufficient elasticity, such as polycarbonate plastic, and properly proportioning the cross-sections of the band 32 and its arms 34 in relation to their length, the accessory holder 10 will attain sufficient springiness to be self-retaining on the shutter housing 12 when it is dimensioned to fit closely thereto. The accessory holder 10 can be clipped into place by pressing it against the shutter housing 12 causing the arms 34 to spread until the detents 36 will slide past the sides 38 and then snap into engagement with the rear corners 38. One simple way to remove the lens accessory holder 10 from the shutter housing is to manually spread the arms 34 apart until the detents 36 disengage from the rear corners 38. The lens accessory holder 10 will then slide forward easily to come off the shutter housing.

Figure 2:
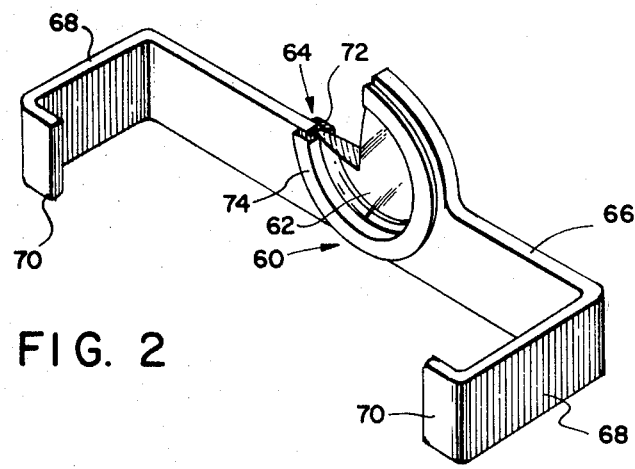
FIG. 2 illustrates another embodiment of the accessory holder, by itself, as seen from its rear.

Reference should now be had to FIG. 2 illustrating an alternative embodiment of the present invention. The alternate embodiment comprises a lens accessory holder 60, a separate lens accessory 62, and a retainer 64 to hold the lens accessory 62 in the holder 60. The lens accessory holder 60 includes a wide band 66 having an arm 68 at each side. Each arm 68 carriers an inwardly directed detent 70 at the end. As in the previously described embodiment, the band 66, the arms 68, and the detents 70 are arranged to fit closely about a shutter housing (not shown in FIG. 2). The band 66 has a hole in it for receiving interchangeable lens accessories. The hole is positioned on the band 66 so it will align with an objective lens when the lens accessory holder 60 is fitted onto a shutter housing. In this embodiment, the band 66 can be made from opaque materials, such as phosphor bronze spring stock, as well as transparent ones. The spring qualities inherent in the selected material retain the lens accessory holder 60 on the shutter housing after it is snapped in place over the objective lens.

The retainer 64 includes two rings 72, 74 threaded so as to engage one another. Each ring 72, 74 has an outward and an inward flange. The outward flanges grasp the holder 66 and the inner flanges grasp the accessory 62 when they are screwed together tightly, thereby retaining the lens accessory 62 in the holder 60. Except as described, this embodiment of the invention functions substantially the same way as the embodiment described above. However, this embodiment has the advantage of accepting interchangeable lens accessories. It will be clear from the description of the embodiment shown in FIG. 1 that the holder 60 could be provided with an extension (not shown in FIG. 2) to position a secondary accessory in front of a photocell window on a shutter housing.

Figure 3:
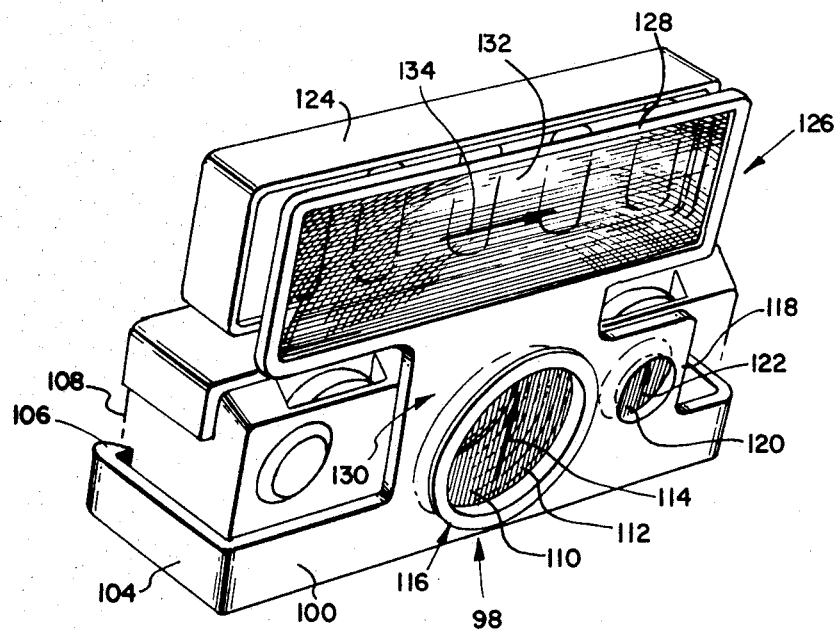
FIG. 3 illustrates a third embodiment of the invention.

A third embodiment, illustrated in FIG. 3, is particularly suited for making close-up photographs of shiny objects and copies of photographs. In copying photographs or photographing shiny objects, specular reflections (highlights) can create veiling glare, thereby obscuring desired details.

The accessory holder 98 of FIG. 3 comprises a lateral band 100, extending the width of a shutter housing 102, with a pair of rearwardly extending arms 104 attached to and integral with the opposite extremities of the band 100 and a pair of detents 106 extending inwardly from the ends of the arms 104 so as to engage the rear corners 108 of the shutter housing 102.

An opening in the band 100, located in front of the objective lens (not visible in FIG. 3), receives an auxiliary lens 110, for making close-up photographs in conjunction with the objective lens, as well as filter 112. The filter 112 comprises a linear polarizing element having a polarization azimuth (transmission axis) 114 oriented as indicated. The auxiliary lens 110 and the filter 112 are kept in place within the opening by a retainer 116.

To compensate the automatic exposure control situate within the shutter housing 102, for the effect of the filter 112 on the camera's exposure, an extension 118 positions an auxiliary filter 120 in front of the photocell (not visible in FIG. 3) of the automatic exposure control. The properties of the auxiliary filter 120 that affect light are preferably the same as those of the filter 112 and the polarization aximuth 122 of the former is preferably parallel to that of the latter.

Situated above the main portion of the accessory holder 98 and in front of a flash bulb array plugged into the shutter housing 102 is a flash filter 126. The flash filter 126 comprises a frame 128 attached to the band 100 by a vertical extension 130.

A polarizing filter 132, held in the frame 128, has its polarization axis 134 orthogonal to the polarization axis 114. The filter 132 polarizes the illumination emanating from the flash array 124 before it reaches an object in the camera's field of view. A Fresnel lens 136 or other means held in the frame 128 directs the illumination emanating from the flash array 124 downwards to compensate for the effect of parallax when illuminating nearby objects.

Only linearly polarized light reaches the object to be photographed because of the filter 132. Light diffusely reflected by the object toward the objective lens will be substantially depolarized, or at least not linearly polarized, while light specularly reflected from shiny areas of the object will not have its state of polarization effected. The polarization azimuth 114 of the filter 112 in front of the objective lens is crossed with respect to the polarization azimuth of the illumination falling on the object. Thus, virtually none of the polarized light specularly reflected from the object will reach the objective lens, while approximately half the diffusely reflected depolarized light incident on the filter 112 will reach the objective lens. Those skilled in the photographic art will understand that this results in a toning down or elimination of objectionable specular reflections otherwise present in the image of a shiny object.

The embodiment shown in FIG. 3 is useful in any situation when one wishes to affect the illumination from the flash array 124 before it falls on the object. It will be understood, therefore, that other optical elements besides polarizers and lenses can be used in the accessory holder 98.

It can be readily seen that many variations and modifications of the present invention are possible in light of the aforementioned teachings, and it will be apparent to those skilled in the art that various changes in form and arrangement of components may be made to suit requirements without departing from the spirit and scope of the invention. It is, therefore, to be understood that within the scope of the appended claims, the instant invention may be practised in a manner than otherwise specifically described herein.

What is claimed is:

1. A lens accessory, for a photographic camera, adapted for clipping onto the shutter housing of a camera so as to be situate in front of an objective lens mounted in said shutter housing, said lens accessory comprising:

optical means for affecting light incident thereon;

a lateral band, integral with said optical means, extending the width of said shutter housing;

a pair of rearwardly extending arms, each of said arms attached to and integral with opposite extremities of said lateral band;

a pair of inwardly extending detents, each of said detents attached to and integral with a different one of said arms, said lateral band, said arms, and said detents fitting closely about said shutter housing and proportioned so said detents engage portions of said shutter housing, whereby said lens accessory attaches to said shutter housing and positions said optical means in front of said objective lens;

auxiliary optical means for affecting light directed toward a photocell of an automatic exposure control within said shutter housing proportionally to the effect of said optical means on light entering said objective lens; and extension means, integral with both said lateral band and said auxiliary optical means, for positioning said auxiliary optical means in front of said photocell.

2. The lens accessory described in claim 1, wherein it is made from a transparent and resilient material as a unitary article.

3. The lens accessory described in claim 2, wherein said optical means is a light filter.

4. The lens accessory described in claim 2, wherein said optical means is an auxiliary lens for said objective lens.

5. The lens accessory holder described in claim 1, further comprising means, attached to said band, for positioning an optical element in front of a flash bulb surmounted on said shutter housing.

* * * * *